(12) United States Patent
del Valle

(10) Patent No.: US 6,558,731 B1
(45) Date of Patent: May 6, 2003

(54) HIGH PROTEIN FROZEN FOOD PRODUCT

(75) Inventor: Frank del Valle, Croton-on-Hudson, NY (US)

(73) Assignee: George Medici, Bronx, NY (US)

( * ) Notice: Subject to any disclaimer, the term of this patent is extended or adjusted under 35 U.S.C. 154(b) by 0 days.

(21) Appl. No.: 09/584,573

(22) Filed: May 31, 2000

(51) Int. Cl.⁷ .................................. A23G 9/02
(52) U.S. Cl. ....................................... 426/656
(58) Field of Search ................................ 426/100, 101, 426/106, 656, 565, 567, 572, 573, 577, 578, 583

(56) References Cited

U.S. PATENT DOCUMENTS 4,387,109 A  *  6/1983  Kahn et al. .................. 426/321

* cited by examiner

Primary Examiner—Keith Hendricks
(74) Attorney, Agent, or Firm—Daniel S. Ortiz

(57) ABSTRACT

A frozen food with a high protein to fat ratio with a smooth creamy mouth-feel is provided. The frozen food can be prepared with a low sugar (available carbohydrate) content and a high protein to sugar and a high protein to fat ratio. A major portion of the protein is derived from water soluble protein.

18 Claims, No Drawings

HIGH PROTEIN FROZEN FOOD PRODUCT

STATEMENT REGARDING FEDERALLY SPONSORED RESEARCH OR DEVELOPMENT

This invention is not related to any Federally Sponsored Research or Development Program.

FIELD OF THE INVENTION

The present invention relates to a high-protein frozen food product and more particularly to a high-protein low available carbohydrate and low fat frozen food product.

RELATED ART

It is known that high-protein diets can be beneficial for weight loss. In addition, high-protein, low carbohydrate diets have been recommended by some doctors for diabetes patients. One of the most difficult problems in maintaining a high-protein, low carbohydrate, low fat diet is the fact that most dessert or snack products which satisfy a craving for a sweet food contain large amounts of carbohydrates and fats and are low in protein content.

In addition to the high-carbohydrate, low-protein nature of many sweet foods, the organoleptic properties such as taste, and mouth-feel, of low-fat, low-sugar products are not satisfactory. The present invention relates to a high-protein, low-fat frozen food product having good organoleptic properties such as taste, mouth-feel and appearance and if required low available carbohydrate content. In particular, high protein frozen products tend to have a grainy mouth-feel which detracts from their acceptability as a frozen food in spite of their potential health benefits.

BRIEF DESCRIPTION OF THE INVENTION

According to the present invention, a high-protein, low-fat frozen food product is provided which can be made in a low available carbohydrate form. The frozen food product comprises:

(a) about 10% to about 25% by weight water soluble protein;
(b) about 0.2% to about 15% by weight natural and/or artificial flavors;
(c) about 6% to about 14% by weight of a bulking and/or sweetening agent;
(d) about 0.1% to about 2.0% by weight microcrystalline cellulose;
(e) about 0.1% to about 2.0% by weight pectin;
(f) water; and optionally:
(g) up to about 2.0% by weight stabilizer; and
(h) up to about 0.25% by weight acidulant.

A frozen food with a higher available carbohydrate concentration can be made by substituting a carbohydrate sweetening agent such as dextrose, fructose, high dextrose corn syrup, honey, concentrated fruit juices and the like for a part or all of the synthetic sweetener and bulking agent. The amount of carbohydrate sweeteners can be varied in conjunction with the synthetic sweeteners to provide a product with a protein available carbohydrate ratio within broad limits. The minimum amount of available carbohydrate in the product is determined by the amount of available carbohydrate in the natural flavors which can be used to manufacture the product. The products with the highest protein/available carbohydrate ratio are products which contain synthetic sweeteners and synthetic flavoring agents.

The frozen product has an excellent smooth, creamy mouth-feel, small ice crystal size and excellent flavor.

DETAILED DESCRIPTION OF THE INVENTION

The high protein frozen product is produced using water soluble protein with a protein efficiency of at least 2.5. The water soluble protein provides a frozen product with a smooth mouthfeel rather than a grainy mouth-feel of insoluble protein. Although a frozen product with excellent mouth-feel requires use of soluble protein, a portion or all of the water soluble protein can be substituted with insoluble protein if mouth-feel is not critical and a grainy product can be tolerated. However, sole use of water soluble protein is preferred. Water soluble proteins such as POWER PRO® WPC, a water soluble high quality protein product of Land O'Lakes Corporation are useful in the practice of the invention. At least about 95–98% of the protein must be water soluble protein and it is preferred that all the protein be water soluble.

The water soluble protein must be soluble in the composition to the extent required, and not precipitate and be denatured under the acid conditions of the composition.

The amount of protein in the composition can range from about 10% by weight to about 25% by weight, preferably from about 11% by weight to about 21% by weight of the composition, more preferably from about 12% by weight to about 20% by weight, and most preferably from about 14% by weight to about 18% by weight.

The flavors used in the composition can be natural, artificial or mixtures thereof. Generally to achieve an intense, uniform flavor from batch to batch of the frozen product, a mixture of natural and artificial flavors is utilized. It is preferred that a mixture of natural and artificial flavors be utilized.

The natural flavors generally comprise macerated or pureed fruits and/or nuts; however, macerated or pureed vegetables can also be utilized. Fruits such as peaches, bananas, berries such as strawberries, blueberries, raspberries, plums, kiwi fruit (seeds removed), pears, pineapple, apples, coconut, oranges, lemons; nuts such as walnuts, hazelnuts, peanuts, cashews and the like are useful. Pureed vegetables such as carrots, celery, and tomatoes can be used to provide flavors generally not available in frozen products but which can provide an alternative to the sweet frozen products available.

The flavors imparted to the frozen product by natural flavoring materials are generally intensified or enhanced by addition of artificial flavoring agents and/or flavor enhancers. The artificial flavoring agents and flavor enhancers are added to the composition to provide a more intense and uniform flavor from batch to batch of the frozen product. The artificial flavors and flavor enhancers are well known to one skilled in the food formulation art and are dependent on the particular flavor desired. Examples of the myriad of natural and artificial flavors and flavor enhancers are shown in the examples and can be selected from: (A) flavor oils such as spearmint, cinnamon, oil of wintergreen (methyl salicylate), peppermint (menthol), clove, bay, anise, eucalyptus, thyme, cedar leaf, oil of nutmeg, allspice, oil of sage, mace, oil of bitter almonds, and cassia oil; (B) artificial, natural and synthetic fruit flavors such as vanilla, and citrus oils including lemon, orange, lime, grapefruit, and fruit essences including apple, pear, peach, grape, strawberry, raspberry, cherry, plum, pineapple, apricot and so forth; (C) aldehydes and esters such as acetaldehyde, benzaldehyde, anisic aldehyde, cinnamic aldehyde, citral, neral, decanal, ethyl vanillin, heliotrope, piperonal, vanillin, alpha-amyl cinnamaldehyde, butyraldehyde, valeraldehyde, citronellal, decanal, dihydrocarvyl acetate, eugenyl formate, aldehyde C-8, aldehyde C-9, aldehyde C-12, 2-ethyl butyraldehyde, hexenal, tolyl aldehyde, veratraldehyde, 2,6-dimethyl-5-heptenal, 2,6-dimethyloctanal, 2-dodecenal, p-methylanisol, and so forth. Generally any flavoring or food additive such as those described in Chemicals Used in Food Processing, publication 1274, pages 63–258, by the National Academy of Sciences, incorporated herein by reference, may be used. Other ingredients which may be used in the flavor component include acids such as citric acid, tartaric acid, malic acid and the like acidulants.

The frozen food product contains a combination of bulking agents and sweeteners. The bulking agents can be non-nutritive or nutritive and are required to provide improved mouth-feel. In low available carbohydrate products, the non-nutritive bulking agents take the place of sugar. If it is required that the product contain sugar, all or a portion of the non-nutritive bulking agent can be replaced by sugar sweeteners.

Non-nutritive bulking agents include compositions such as mallitol, sorbitol, hydrogenated corn syrup, inositol and the like. A bulking agent is required to improve mouth-feel of the frozen product or the flavor when the bulking agent comprises a sweetener such as dextrose, fructose or the like. Artificial sweeteners such as (A) water-soluble naturally-occurring intense sweeteners such as dihydrochalcones, monellin, steviosides, glycyrrhizin, dihydroflavenol, and L-aminodicarboxylic acid aminoalkanoic acid ester amides, such as those disclosed in U.S. Pat. No. 4,619,834, and mixtures thereof; (B) water-soluble artificial sweeteners including the soluble saccharin salts such as sodium or calcium saccharin salts, cyclamate salts, the sodium, ammonium or calcium salts of 3,4-dihydro-6-methyl-1,2,3-oxathiazine-4-one-2,2-dioxide, the potassium salt of 3,4-dihydro-6-methyl-1,2,3-oxathiazine-4-one-2,2-dioxide (Acesulfam-K), the free acid form of saccharin, and the like, and mixtures thereof; (C) dipeptide based sweeteners including L-aspartic acid derived sweeteners, such as 1-aspartyl-L-phenylalanine methyl ester (Aspartame) and materials described in U.S. Pat. No. 3,492,131, L-alphaaspartyl-N-(2, 2,4,4-tetramethyl-3-thietanyl)-D-alaninamide hydrate (Alitame), methyl esters of L-aspartyl-L-phenyl-glycerine and L-aspartyl-L-2,5-dihydrophenyl-glycine, L-aspartyl-2, 5dihydro-L-phenylalanine, L-aspartyl-L-(1-cyclohexene)-alanine, and the like, and mixtures thereof; (D) water-soluble. intense sweeteners derived from naturally-occurring water-soluble sweeteners, such as chlorinated derivatives of ordinary sugar (sucrose), e.g., chlorodeoxysugar derivatives such as derivatives of chlorodeoxysucrose or chlorodeoxygalactosucrose, known, for example, under the product designation of Sucralose®; examples of chlorodeoxysucrose and chlorodeoxygalactosucrose derivatives include but are not limited to: 1-chloro-1'-deoxysucrose; 4-chloro-4-deoxy-alpha-D-galactopyranosyl-alpha-D-fructofuranoside, or 4-chloro-4-deoxygalactosucrose; 4-chloro-4-deoxy-alpha-D-galactopyranosyl-1-chloro-1deoxy-beta-D-fructo-furanoside, or 4,1'-dichloro-4,1'dideoxygalactosucrose; 1',6'-dichloro-1',6'-dideoxysucrose; 4-chloro-4-deoxy-alpha-D-galactopyranosyl-1,6-dichloro-1,6-dideoxy-beta-D-fructofuranoside, or 4,1',6'-trichloro-4,1',6'-trideoxygalactosucrose; 4,6-dichloro-4,6-dideoxy-alpha-D-galactopyranosyl-6-chloro-6-deoxy-beta-D-fructofuranoside, or 4,6,6'-trichloro-4,6,6'-trideoxygalactosucrose; 6,1',6'-trichloro-6,1',6'-trideoxysucrose; 4,6-dichloro-4,6-dideoxy-alpha-D-galacto-pyranosyl-1,6-dichloro-1,6-dideoxy-beta-D-fructofuranoside, or 4,6,1',6'-tetrachloro-4,6,1',6'-tetradeoxygalacto-sucrose; and 4,6,1',6'-tetradeoxy-sucrose, and mixtures thereof; and (E) protein based intense sweeteners such as thaumaoccous denielli (Thaumatin I and II).

Microcrystalline cellulose is used in the present invention to provide a smooth to creamy mouth-feel to the frozen product. It provides the function as a fat replacement or substitute to provide improved mouth-feel. Microcrystalline cellulose comprises fine particulate material which absorbs water and forms a paste which is used as a fat substitute. A preferred microcrystalline cellulose is Blanver's Best™ Formula 4 cellulose gel sold by Opta Food Ingredients.

Pectin, preferably low methoxyl pectin 35, is required in the composition of the present invention to bind calcium and protein to protect the protein from coagulation due to low pH. Since the fruit flavoring materials used in the present invention are acidic, the pectin prevents formation of insoluble protein particles which can destroy the smooth creamy mouth-feel of the product.

The composition of the invention is water based and can contain up to about 80% by weight water, preferably from about 45 to about 65% by weight water, and most preferably from about 50 to about 60% by weight water. Preferably water makes up the remainder of the formulation after addition of the non-aqueous materials.

The frozen product optionally contains up to about 2% by weight of a stabilizer to provide stability and maintain the smooth creamy texture of the product if it is to pass through many cycles in temperature. Temperature cycling encourages the growth of ice crystals which can cause the texture to become grainy. Inclusion of the stabilizer in the product is preferred but is not critical to the composition unless temperature cycling is expected to occur. However, inclusion of stabilizers in the composition contributes to the smooth creamy mouth-feel of the composition. Useful stabilizers include gums, but are not limited to material such as cellulose gum, guar gum, locust bean gum, carrageenin and the like. Gum stabilizers are well known to food chemists and can be readily selected to provide and maintain the smooth creamy texture of the frozen product of the invention.

The frozen product can contain acidulants such as citric acid, malic acid, tartaric acid and the like. The acids can be partially neutralized and act as flavor ingredients. If low sodium frozen products are required, potassium salts of the acids can be used.

The frozen products can be prepared by mixing the ingredients other than the protein, fruits, flavors, colors and acidulants, pasteurizing the mixture, cooling the pasteurized mixture, then adding the protein, fruits, flavors, colors and acidulants. A mixture containing the protein can also be pasteurized if the temperature is controlled closely to prevent coagulation and denaturing of the protein. However, the fruits, flavors, colors and acidulants are preferably added after the pasteurization. After all the ingredients have been mixed, the mixture is cooled and frozen in a desired shape. A preferred shape is a bar or a cup containing from about 85 to about 120 grams of frozen product.

The invention will be illustrated by the following examples, which are not limiting.

EXAMPLE 1

Peach Flavor Frozen Product

A mixture having the following composition was prepared.

| Ingredient | Parts by Weight |
|---|---|
| Water | 6831 |
| Maltitol | 1009 |
| Pectin | 31.6 |
| Microcrystalline Cellulose | 35.1 |
| Merecol CLG1 | 4.9 |
| Aspartame | 2.3 |
| SUNETT[2] | 2.3 |
| POWER PRO[5] WPG LoL | 2017.9 |
| Water | 228 |
| Red #4 (1.5% by weight solution) | 26.6 |
| Yellow #5 (5% by weight solution) | 26.6 |

The above ingredients were dissolved in the water. The mixture was batch pasteurized under strictly controlled conditions (not to exceed 157° F.) for 30 to 45 minutes holding time at temperature. The pasteurized mixture was cooled and mixed with the remaining flavoring materials and thoroughly blended. The acidulant solution was slowly added with strong agitation to avoid contact of the protein with the strong acid solution to prevent protein coagulation.

| | | |
|---|---|---|
| Peach Puree | | 922.9 |
| Vanilla Cookie Dough 660244[3] | | 32.3 |
| Vanilla 680246[3] | | 9.23 |
| Peach Flavor 533585 | | 46.2 |
| Citric Acid[4] | | 6.92 |
| Potassium Citrate[4] | | 3.46 |

[1]Merecol CLG - a mixture of natural gums (guar, locust, bean, carageena)
[2]SUNETT ™ - a synthetic sweetener Acelsulphane K
[3]Cookie Dough ⎫
Vanilla         ⎬ Flavoring Agent
Peach Flavor    ⎭
[4]Citric Acid and Potassium Citrate were added as solution in 50 parts of water.
[5]POWER PRO ™ WPG - Water soluble whey protein The mixture was poured into molds holding 93 grams of the mixture and frozen. The high protein frozen bar contained the following nutritional values.

| | |
|---|---|
| Total Fat | 0 gram |
| Cholesterol | 0 gram |
| Sodium | 30 milligrams |
| Total Carbohydrate | 10 grams (10.7% by weight) |
| Fiber | 0 gram |
| Sugar | 1 gram |
| Protein | 15 grams (16% by weight) |

The bar had a smooth creamy mouth-feel and had a 15:1 protein to sugar ratio and substantially no fat.

EXAMPLE 2

Strawberry Flavor Frozen Product

A mixture of the following ingredients was prepared according to the method of Example 1.

| Ingredient | Parts by Weight |
|---|---|
| Water | 8830.8 |
| Maltitol | 1009 |
| Pectin | 31.6 |
| MC Cellulose | 35.1 |
| Merecol CLG | 4.67 |
| POWER PRO ™ WPC | 2018 |
| Water | 86 |
| Strawberry Puree | 898.3 |
| Aspartame | 1.8 |
| SUNETT | 1.8 |
| Vanilla Cookie Dough[3] 680244 | 22.46 |
| Vanilla[3] 680246 | 44.9 |
| Strawberry[3] 61006 | 89.9 |
| Raspberry[3] 600877 | 22.5 |
| Red #40 (1.5% by weight solution) | 112.3 |
| Yellow #5 (5% by weight solution) | 7.5 |
| Citric Acid | 10.28 |
| Potassium Citrate | 5.1 |
| Water | 50 |

[3]Flavoring Agents

The mixture was poured into 92 gram molds and frozen to provide a frozen high protein product with a smooth mouth-feel and excellent flavor. Large ice crystals did not form after several months storage.

The nutritional analysis of the frozen product was:

| | |
|---|---|
| Total Fat | 0 gram |
| Cholesterol | 0 gram |
| Sodium | 35 milligrams |
| Total Carbohydrates | 11 grams |
| Sugar | 2 grams (2.2% by weight) |
| Protein | 15 grams (16.3% by weight) |
| Fiber | 0 gram |

The protein to sugar ratio was 7.5 and the frozen product contained no fat.

EXAMPLE 3

Pina Colada Flavor Frozen Product

A mixture of the following ingredients was prepared as in Example 1, poured into molds holding 88 grams and frozen.

| Ingredient | Parts by Weight |
|---|---|
| Water | 6830.81 |
| MALTITOL | 1009 |
| Pectin | 31.6 |
| MC Cellulose | 35.1 |
| Merecol CLG | 4.7 |
| POWER PRO ™ WPD LoL | 2017.9 |
| Water | 464.4 |
| Crushed Pineapple[3] | 546.5 |
| Coconut Cream[3] | 131.2 |
| Aspartame | 2.19 |
| SUNETT | 2.19 |
| Vanilla Cookie Dough[3] 680244 | 21.9 |
| Vanilla[3] 680246 | 6.56 |
| Pineapple Flavor[3] 609281 | 43.7 |
| Coconut Flavor[3] 610571 | 43.7 |
| Coconut Enhancer[3] 610627 | 43.7 |
| Emulsifier | trace |

[3]Flavor Ingredients

Nutritional Values

| | |
|---|---|
| Total Fat | 1 gram |
| Saturated Fat | 0.5 gram |
| Cholesterol | 0 milligram |
| Sodium | 25 milligrams |
| Total Carbohydrate | 8 grams |
| Dietary Fiber | 0 gram |
| Sugar | 0 gram |
| Protein | 15 grams (17% protein) |

The frozen product had a smooth creamy mouth-feel and did not develop large ice crystals after storage for four months.

EXAMPLE 4
Banana Flavor Frozen Product

A mixture of the following ingredients was prepared according to the method of Example 1.

| Ingredient | Parts by Weight |
|---|---|
| Water | 6830.81 |
| MALTITOL | 1009 |
| Pectin | 31.6 |
| Microcrystalline Cellulose | 35.1 |
| Merecol CLG | 4.87 |
| POWER PRO ™ WPC | 2018 |
| Banana Puree | 947.7 |
| Heavy Cream | 155.4 |
| Aspartame | 0.95 |
| SUNETT | 0.95 |
| Vanilla Cookie Dough[3] 680244 | 37.9 |
| Vanilla[3] 680246 | 66.4 |
| Banana Flavor[3] 601359 | 47.4 |
| Banana Flavor[3] 52446 | 47.4 |
| Emulsifier | 0.1 |

[3]Flavoring Agents

The mixture was poured into molds holding 93 grams and frozen. The high protein bar contained the following nutritional values:

| | |
|---|---|
| Total Fat | 0.5 gram |
| Cholesterol | 0 gram |
| Sodium | 25 milligrams |
| Total Carbohydrate | 11 grams |
| Sugar | 1 gram |
| Protein | 15 grams (16% protein) |
| Dietary Fiber | 0 gram |

The protein to sugar ratio was 15 and the protein to fat ratio was 30.

The frozen product had a smooth mouth-feel and excellent flavor. Large ice crystals did not form after five months storage in a freezer compartment of a home refrigerator.

The frozen product of the invention is a high protein, low fat frozen product with a smooth creamy mouth-feel and does not lose its smooth consistency when stored frozen for extended periods.

The properties of the product are unexpected since the product contains substantially no fat but has organoleptic properties (smooth, creamy, mouth-feel) associated with fat containing foods.

The frozen food can be prepared with a higher available carbohydrate (sugar) content by substituting sugar for all or a portion of the non-nutritive bulking agents. In addition, small amounts of cream can be added to the frozen food composition to further increase the smooth creamy nature of the product.

Fruits and flavors such as banana, raspberry, blueberry, kiwi, orange, lemon, lime and the like can be used to flavor the frozen food product of the invention. The nutritional attributes of the product can abe further improved by including in the composition small amounts of natural or synthetic vitamins and minerals.

The product can also contain small or trace amouns of food grade emulsifier. Amounts of emulsifier up to about 0.006% by weight can be useful.

When the frozen product is provided in a cup, the mixture can be frozen in a continuous freezing apparatus, introduced into the cup and hardened in a freezing zone.

I claim:
1. A high protein low fat frozen food which comprises:
 (a) 11% to about 25% by weight water soluble protein;
 (b) about 0.2% to about 15% by weight of at least one of natural and artificial flavors;
 (c) about 6% to about 14% by weight of bulking and sweetening agents;
 (d) about 0.1 to about 2.0% by weight of microcrystalline cellulose;
 (e) about 0.1% to about 2.0% by weight of pectin;
 (f) the remainder comprises water after addition of the non-aqueous materials; and:
 (g) optionally, up to about 2.0% by weight of stabilizer; and
 (h) optionally, up to about 0.25% by weight of acidulant.
2. The frozen food of claim 1 wherein the frozen food contains at least one member selected from the group consisting of gum stabilizers and acidulant.
3. The frozen food of claim 1 containing at least one acidulant.
4. The frozen food of claim 3 wherein the acidulant comprises citric acid.
5. The frozen food of claim 1 additionally comprising up to 0.006% by weight of an emulsifier.
6. A process for preparing a frozen food which comprises: forming a mixture comprising:
 (a) 11% to about 25% by weight water soluble protein;
 (b) about 0.2% to about 15% by weight of at least one of natural and artificial flavors;
 (c) about 6% to about 14% by weight of bulking and sweetening agents;
 (d) about 0.1 to about 2.0% by weight of microcrystalline cellulose;
 (e) about 0.1% to about 2.0% by weight of pectin;
 (f) the remainder comprises water after addition of the non-aqueous materials; and:
 (g) optionally, up to about 2.0% by weight of stabilizer; and
 (h) optionally, up to about 0.25% by weight of acidulant; and freezing the mixture.
7. The process of claim 6 wherein the water soluble protein, the bulking and sweetening agents, the microcrystalline cellulose, the pectin, the optional stabilizer and a portion of the water are mixed and pasteurized at a maximum temperature of about 157° F., and subsequently the pasteurized mixture cooled and mixed with the at least one flavoring agent and optional acidulant.
8. The process of claim 6 wherein the mixture is continuously frozen until in a soft state, then placed in a shaped container and hardened.
9. The process of claim 8, wherein the shaped container comprises a cup with a cover.
10. The frozen food of claim 1 which comprises:
 (a) 12 to about 25% by weight water soluble protein; and
 (f) from about 50 to about 80% by weight of water.

11. The frozen food of claim 1 in the form of a frozen bar.

12. The frozen food of claim 1 further comprising a cup containing said frozen food product.

13. The frozen food of claim 1 wherin the bulking and sweetening agent comprises at least one member selected from the group consisting of (a) non-nutrative bulking agents and artificial sweeteners, (b) non-nutrative bulking agents, artificial sweeteners and nutrative bulking agent sweeteners, (c) nutrative bulking agent sweeteners, (d) nutrative bulking agent sweeteners and artificial sweeteners and (e) non-nutrative bulking agents and nutrative bulking agent sweeteners.

14. The frozen food of claim 13 which comprises:

(f) from about 45% to about 80% by weight water.

15. The process of claim 6 wherein the mixture comprises:

(f) about 45% to about 65% by weight water.

16. The frozen food of claim 1 wherein the bulking and sweetening agent comprises at least one member selected from the group consisting of (a) maltitol and synthetic sweetener, (b) sorbitol and synthetic sweetener, (c) hydrogenated corn syrup and synthetic sweetener, (d) inositol and synthetic sweetener, (e) dextrose and (f) fructose.

17. The frozen food of claim 1 wherein the bulking and sweetening agent consists essentially of at least one non-nutrative bulking agent and artificial sweetener.

18. The frozen food of claim 1 containing from about 50% to about 80% by weight of water.

* * * * *